(12) United States Patent
Zhou et al.

(10) Patent No.: US 8,849,126 B2
(45) Date of Patent: Sep. 30, 2014

(54) ELECTRONIC PHASE CONJUGATION FOR IMPAIRMENT COMPENSATION IN A FIBER COMMUNICATION SYSTEM

(75) Inventors: Xiang Zhou, Holmdel, NJ (US); Guifang Li, Orlando, FL (US); Eduardo F. Mateo, Princeton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 467 days.

(21) Appl. No.: 12/987,595

(22) Filed: Jan. 10, 2011

(65) Prior Publication Data

US 2012/0177386 A1    Jul. 12, 2012

(51) Int. Cl.
| | |
|---|---|
| H04B 10/00 | (2013.01) |
| H04B 10/12 | (2006.01) |
| H04B 10/2569 | (2013.01) |
| H04B 10/2543 | (2013.01) |
| H04B 10/2507 | (2013.01) |
| H04B 10/2513 | (2013.01) |
| H04B 10/2537 | (2013.01) |

(52) U.S. Cl.
CPC ........ H04B 10/2513 (2013.01); H04B 10/2569 (2013.01); H04B 10/2543 (2013.01); H04B 10/2572 (2013.01); H04B 10/2537 (2013.01)
USPC .......... 398/158; 398/140; 398/147; 398/148; 398/149; 398/150; 398/159; 398/160; 398/161

(58) Field of Classification Search
None
See application file for complete search history.

(56) References Cited

U.S. PATENT DOCUMENTS

| | | | | |
|---|---|---|---|---|
| 5,060,312 | A  * | 10/1991 | Delavaux | 398/204 |
| 2002/0196507 | A1 * | 12/2002 | Stuart | 359/179 |
| 2005/0074245 | A1 * | 4/2005 | Griffin | 398/188 |

OTHER PUBLICATIONS

Dischler et al., "Transmission of 1.2 Tb/s Continuous Waveband PDM-OFDM-FDM Signal with Spectral Efficiency of 3.3 bits/s/Hz over 400 km of SSMF", IEEE, pp. 1-3 (2009).
Jansen et al., "Optical Phase Conjugation for Ultra Long-Haul Phase-Shift-Keyed Transmission" Journal of Lightwave Technology, vol. 24, No. 1, pp. 54-64 (2006).
Li et al., "Electronic Post-Compensation of WDM Transmission Impairments Using Coherent Detection and Digital Signal Processing", Optics Express 880, vol. 16, No. 2, pp. 1-9 (2008).

(Continued)

*Primary Examiner* — Darren E Wolf
(74) *Attorney, Agent, or Firm* — Hoffmann & Baron, LLP (57) ABSTRACT

Exemplary embodiments include a method and systems for impairment compensation in a communication system. The systems can include an electronic phase conjugation system that receives an incoming optical signal from a first section of a fiber optic link, converts the incoming optical signal to an in-phase electric signal and a quadrature electrical signal, and generates a phase conjugated outgoing optical signal from the in-phase and quadrature electrical signals. The phase conjugated outgoing optical signal compensates for impairment of the fiber in the communication system.

15 Claims, 3 Drawing Sheets

(56) References Cited

OTHER PUBLICATIONS

Mateo et al., "Efficient Compensation of Inter-Channel Nonlinear Effects Via Digital Backward Propagation in WDM Optical Transmission", Optics Express 15144, vol. 18, No. 14, pp. 1-11 (2010).

Savory et al., Impact of Interchannel Nonlinearities on a Split-Step Intrachannel Nonlinear Equalizer, IEEE Photonics Technology Letters, vol. 22, No. 10, pp. 673-675 (2010).

Shigeka Watanabe, "Exact Compensation for Both Chromatic Dispersion and Kerr Effect in a Transmission Fiber Using Optical Phase Conjugation", Journal of Lightwave Technology, vol. 14, No. 3, pp. 243-248 (1996).

Goldfarb et al., "Experimental Demonstration of Fiber Impairment Compensation Using the Split-Step Finite-Impulse-Response Filtering Method", IEEE Photonics Technology Letters, vol. 20, No. 22, pp. 1887-1889 (2008).

Li et al., "Dispersion-Compensation Schemes for 160-Gb/s 1200-km Transmission by Optical Phase Conjugation", Journal of Lightwave Technology, vol. 25, No. 8, pp. 1986-1995 (2007).

Ip et al., "Compensation of Dispersion and Nonlinear Impairments Using Digital Backpropagation", Journal of Lightwave Technology, vol. 26, No. 20, pp. 3416-3425 (2008).

Paolo Minzioni, "Unifying Theory of Compensation Techniques for Intrachannel Nonlinear Effects", Optics Express 8460, vol. 13, No. 21, pp. 1-9 (2005).

Shieh et al., "Coherent Optical OFDM: Theory and Design", Optics Express 841, vol. 16, No. 2, pp. 1-19 (2008).

Yariv et al., "Compensation for Channel Dispersion by Nonlinear Optical Phase Conjugation" Optics Letters, vol. 4, No. 2, pp. 52-54 (1979).

* cited by examiner

ELECTRONIC PHASE CONJUGATION FOR IMPAIRMENT COMPENSATION IN A FIBER COMMUNICATION SYSTEM

BACKGROUND

1. Technical Field

Exemplary embodiments are related to impairment compensation, such as distortion, dispersion, non-linear effects and the like in fiber optic communication systems, and particularly to electronic phase conjugation for impairment compensation of fiber optic links.

2. Brief Description of the Related Art

To meet the ever growing capacity demand in a core network, future high-speed optical transport will likely employ fiber transmission systems with very high data-rate channels, such as 400 gigabits per second (Gb/s), 1 terabits per second (Tb/s), and the like, and high spectral efficiency (SE). With the aim of increasing SE, high-order modulation formats may be used together with tightly spaced wavelength-division multiplexing (WDM). Since advanced modulation formats typically require increased signal-to-noise ratio (SNR), performance of high SE transmission systems may be limited by fiber nonlinearity in the form of, for example, intra- and inter-channel effects. Consequently, techniques for the mitigation and/or compensation of nonlinear effects in optical transmission are attracting significant interest.

Recently, techniques based on digital backward propagation (DBP) have been proposed for compensation of fiber impairments. DBP requires a high degree of complexity. DBP is universal, system independent, and does not involve in-line symmetry. However, DPB demands very high computation resources, especially for the compensation of inter-channel effects.

Optical phase conjugation (OPC) has also been also proposed for the comprehensive compensation of fiber impairments. Using OPC, distortions are typically cancelled out when group delay and nonlinear phase-shift occur in a symmetric fashion with respect to the location at which OPC is performed. OPC is fast and enables large bandwidth and real-time compensation. However, OPC typically requires complex optical hardware and mid-link symmetry to be effective.

In OPC, a spectral inversion of an optical signal is typically performed at a midpoint of a fiber optic link to invert dispersion and nonlinear distortions experienced by the optical signal and to compensate for dispersion and nonlinear distortions that the optical signal is expected to experience in the second half of the fiber optic link. The spectral inversion implemented using optical phase conjugation is conventionally achieved using nonlinear effects, such as four-wave mixing (FWM) or second harmonic generation (SHG). To be efficient, such effects typically require highly nonlinear media, high optical power or a combination of both.

FWM has been implemented using silica to achieve optical phase conjugation. Since silica has a relatively low nonlinearity, high pump power values are required to achieve efficient wavelength conversion. This increases the efficiency of undesirable scattering effects that eventually limit the OPC performance. In addition, FWM requires phase matching which depends strongly on chromatic dispersion. One way to decrease the pump power is to increase the interaction distance. However, this makes integration difficult and aggravates problems such as dispersion fluctuations.

Semiconductor optical amplifiers (SOA) have also been used as nonlinear medium for optical phase conjugation. In contrast to silica fiber, SOAs are an active medium with high nonlinearity. SOAs can achieve large conversion efficiencies in relatively short distances which presents a compact solution compared to fiber devices. However, SOAs typically require electrical energy which creates heat and long term damage.

Together with FWM, SHG can be used to create phase conjugation. For example, periodically-poled lithium-niobate (PPLN) has been used as a nonlinear medium. PPLN can produce quasi-phase matched SHG with a high efficiency conversion. However, PPLN requires high temperatures for optimum operation which prevents integration with other components.

Both DPB and OPC are capable of compensating inter-channel nonlinear effects in WDM systems. OPC is typically restricted to point-to-point links, where all the channels share the same transmitter and receiver locations. In fiber networks with added/drop multiplexing throughout the link, compensation of inter-channel effects is typically not possible with OPC. In current optical networks, reconfigurable optical add-drop multiplexers (ROADMs) are being deployed to route information in the optical layer, which can inhibit compensation of inter-channel effects using OPC because the interacting channels do not share the same path.

Future optical networks are expected to support reconfigurable optical add/drop multiplexer (ROADMs), as well as channels operating at different baud rates and different SNRs to accommodate varying capacity demands. One scenario of interest is the transmission of a high-rate (high SNR) express channel together with neighboring lower speed (lower SNR) add/drop channels. These express channels can be limited in performance by fiber nonlinearity prior to reaching the add/drop networking channels.

SUMMARY

In one aspect, a communication system in which impairment compensation is performed using electronic phase conjugation is disclosed. The system can include a fiber optic link and an electronic phase conjugation system. The fiber optic link facilitates transmission of optical signals in a communication system. The electronic phase conjugation system is disposed between a first section of the fiber optic link and a second section of the fiber optic link, and receives an incoming optical signal from the first section of the fiber optic link. The electronic phase conjugation system converts the incoming optical signal to an in-phase electric signal and a quadrature electrical signal and generates a phase conjugated outgoing optical signal from the in-phase and quadrature electrical signals. The phase conjugated outgoing optical signal compensating for impairment of the fiber in the communication system.

In another aspect, an electronic phase conjugation system for impairment compensation in a communication system is disclosed that includes a coherent detector and an in-phase/quadrature modulator. The coherent detector receives an incoming optical signal from an optical fiber link and converts the incoming optical signal to an in-phase electrical signal and a quadrature electrical signal. The I/Q modulator generates a phase conjugated outgoing optical signal from the in-phase and quadrature electrical signals. The phase conjugated outgoing optical signal compensating for impairments in the optical fiber link.

Embodiments of the coherent detector can include a hybrid mixer, optical-to-electrical converters, and/or difference nodes. The mixer can separate the incoming optical signal into in-phase optical components and quadrature optical components. A first one of the in-phase components can have a phase of zero, a second one of the in-phase components can have a phase of π, a first one of the quadrature optical components can have a phase of π/2, a second one of the quadrature optical components can have a phase of −π/2. A first optical-to-electrical converter can convert the in-phase optical components to in-phase electrical components and a second optical-to-electrical converter can convert the quadrature optical components to quadrature electrical component. A first difference node to generate an in-phase electrical signal in response to a difference between the first one of the in-phase electrical components having a phase of zero and the second one of the in-phase electrical components having a phase of π, and a second difference node to generate a quadrature electrical signal in response to a difference between the first one of the quadrature electrical components having a phase of π/2 and the second one of the quadrature electrical components having a phase of −π/2.

Embodiments of the I/Q modulator electro-optic modulators, such as Mach-Zedhner modulators, a phase shifter, and an optical coupler. A first electro-optic modulator can convert the light source signal into an outgoing in-phase optical signal in response to the in-phase electrical signal. A second electro-optic modulator can convert the light source signal into an outgoing quadrature optical signal in response the quadrature electrical signal. The phase shifter can shift a phase of the outgoing quadrature optical signal to form a phase shifted outgoing quadrature optical signal. The optical coupler can combine the outgoing in-phase optical signal with the phase shifted outgoing quadrature optical signal to form the phase conjugated outgoing optical signal.

In yet another aspect, a method for impairment compensation in a communication system is disclosed. The method includes receiving an optical signal from transmitted through a first section of an optical fiber link in a communication system, converting the incoming optical signal to an in-phase electric signal and a quadrature electrical signal and generating a phase conjugated outgoing optical signal from the in-phase and quadrature electrical signals, the phase conjugated outgoing optical signal compensating for impairment of the optical fiber link in the communication system.

In some embodiments, the conversion the incoming optical signal separating the incoming optical signal into in-phase optical components and quadrature optical components, converting the in-phase optical components to the in-phase electrical components, and convert the quadrature optical components to the quadrature electrical components.

In some embodiments, the conversion of the incoming optical signal can also include generating the in-phase electrical signal in response to a difference between a first one of the in-phase electrical components having a phase of zero and a second one of the in-phase electrical components having a phase of π and generating a quadrature electrical signal in response to a difference between a first one of the quadrature electrical components having a phase of π/2 and a second one of the quadrature electrical components having a phase of −π/2.

In some embodiments, generation the phase conjugated outgoing optical signal includes generating a light source signal with a local oscillator, converting the light source signal into an outgoing in-phase optical signal in response to the in-phase electrical signal, converting the light source signal into an outgoing quadrature optical signal in response the quadrature electrical signal and inverting a phase of the outgoing quadrature optical signal.

Any combination of the above features is envisaged. Other objects and features will become apparent from the following detailed description considered in conjunction with the accompanying drawings, wherein like reference numerals in the various drawings are utilized to designate like components. It is to be understood, however, that the drawings are designed as an illustration only and not as a definition of the limits of the invention.

DETAILED DESCRIPTION

Exemplary embodiments are related to implementing electronic phase conjugation for impairment compensation in a communication system. For example, exemplary embodiments can use electronic phase conjugation to compensate for fiber dispersion and/or intra-channel nonlinear effects. Phase conjugation refers to a process of inverting a phase of a signal so that the resulting signal from the phase conjugation has the same spatial variations in intensity and phase as the original signal wave, but with the sense of the phase variations reversed. Electronic phase conjugation is a process of inverting the phase of an incoming optical signal in the electric domain and outputting a phase conjugated optical version of the incoming optical signal. Phase refers to an offset in a starting point of cycle of a periodic signal measured from an arbitrary origin typically expressed as zero degrees, where a phase of zero indicate that no offset exists and a phase of pi or 180 degrees indicates an offset of pi or 180 degrees from zero. In some embodiments, an EPC system can be implemented in a high baud rate, high spectral efficiency channel to extend the system reach of the channel (e.g., a super channel, most likely to use high-order modulation formats) where performance of such a channel can be limited by intra-channel fiber nonlinear effects and high SNR requirements.

Exemplary embodiments can implement phase conjugation in the electronic rather than the optical domain using an electronic phase conjugation system that can include coherent detection for down-conversion and in-phase/quadrature (I/Q) modulation for up conversion. Phase conjugation can be implemented in the electronic domain on a per channel basis to compensate for fiber chromatic dispersion and/or intra-channel nonlinear effects in high bit-rate fiber transmission phase conjugation, can also be implemented to achieve impairment compensation in multi-rate wave division multiplexing (WDM) systems consisting of, for example, an express orthogonal frequency division multiplexing (OFDM) channel, a neighboring quadrature phase shift key (QPSK) channel, and the like. Using EPC, distortions can be cancelled by inverting an incoming optical signal to invert impairments, such as dispersion and nonlinear distortions experienced by the incoming optical signal and to compensate for impairments, such as dispersion and nonlinear distortions that an outgoing optical signal is expected to experience.

Figure 1:
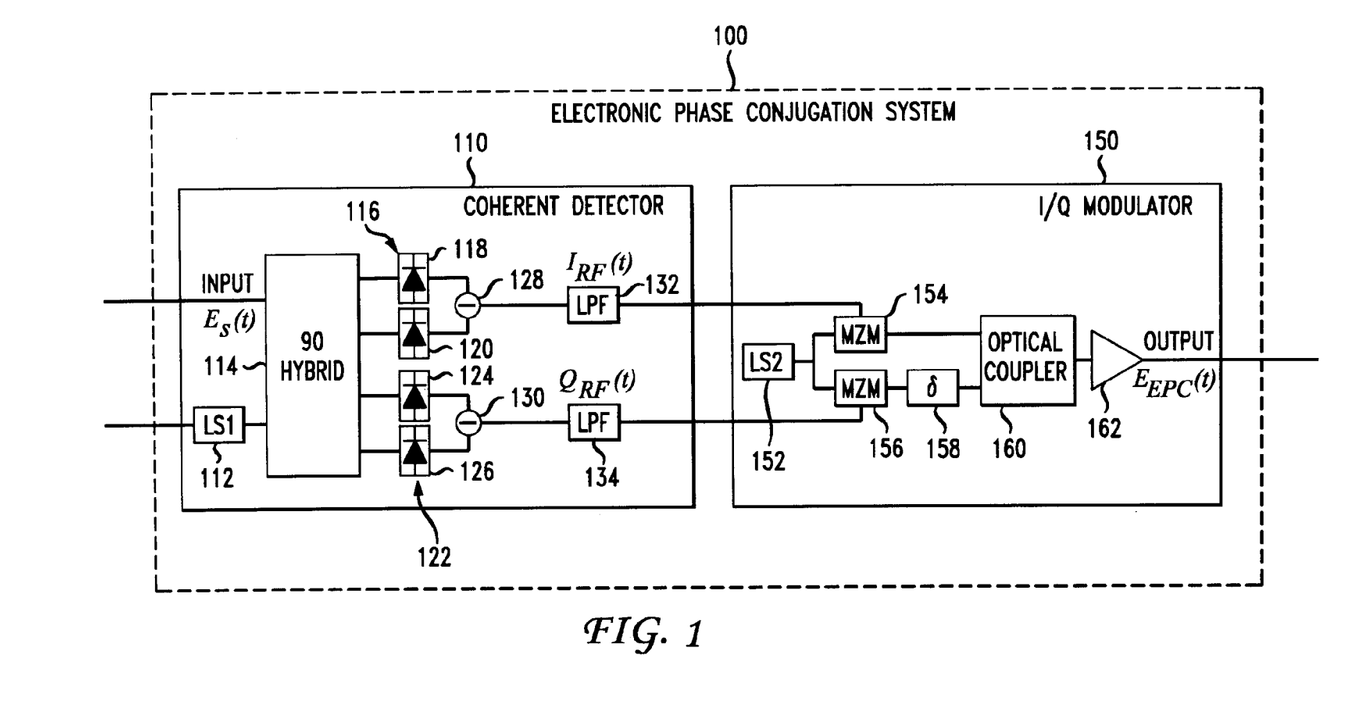
FIG. 1 is an exemplary electronic phase conjugation system to facilitate electronic phase conjugation for impairment compensation in fiber optic communication systems.

FIG. 1 depicts a block diagram of an exemplary electronic phase conjugation (EPC) system 100. The system 100 can include a coherent detector 110 and an in-phase/quadrature (I/Q) modulator 150. The coherent detector 110 is a device or circuit that performs down-conversion of a signal to recover the baseband portion of the signal from a carrier signal. The I/Q modulator 150 is a device or circuit that performs up-conversion by impressing a lower frequency signal upon a higher-frequency periodic wave, typically referred to as a carrier wave. Phase conjugation can be implemented in the electronic domain to compensate for or mitigate chromatic dispersion (CD), fiber nonlinear effects, and the like, using the coherent detector 110 and I/Q modulator 150. Embodiments of the system 100 can compensate for intra-channel nonlinear effects in multi-rate systems and/or single-rate WDM systems with high per channel baud rate.

The EPC system 100 can be disposed in an optical fiber link and can receive an incoming optical signal transmitted through a section of the link. Impairment of a signal refers to a diminishing, weakening, or other undesirable effect experienced by an optical signal traversing an optical fiber link, such as dispersion and distortion. Compensation refers to correcting, mitigating, counteracting, reducing, and the like. Impairment compensation refers to compensating for impairments of an optical signal traversing the optical fiber link.

The incoming optical signal can be impaired as a result of, for example, dispersion and nonlinear distortions caused by traveling through a section of the link. In some embodiments, the distortions and nonlinear phase-shift can occur symmetrically with respect to a mid-point of the link. The incoming optical signal can be processed by the EPC system 100 in the electronic domain to conjugate the phase associated with the incoming optical signal. Using the EPC system 100, which can be disposed at the mid-point of the link, the dispersion and nonlinear distortions experienced by the incoming optical signal can be inverted as a result of electronic phase conjugation. The EPC system 100 can generate a phase conjugated outgoing optical signal to compensate for impairments, such as dispersion and nonlinear distortions, experienced in the first section of the link and to compensate for impairments, such as dispersion and nonlinear distortions, that the outgoing optical signal is expected to experience in the second half of the fiber optic link.

The coherent detector 110 can include a local oscillator 112, a hybrid mixer or coupler 114 (hereinafter "mixer 114"), an optical-to-electric converter 116 (hereinafter "converter 116"), an optical-to-electric converter 122 (hereinafter "converter 122"), difference nodes 128 and 130, and low pass filters 132 and 134. The local oscillator 112 can include a light source, such as a laser. The coherent detector 110 can be used to recover amplitude and phase information of an incoming optical signal and to separate the incoming optical signal into in-phase and quadrature optical components. The in-phase and quadrature optical components of the incoming optical signal can be converted to electric signals by the coherent detector 110 for transmission to the modulator 150 for further processing. Converting refers to changing from one domain to another domain, such as from an optical domain to an electrical domain.

The mixer 114 can include an input, which receives an incoming optical signal $E_s(t)$ that has travelled through a section of a fiber optic link, and an input, which receives a light source signal $E_{LO}(t)$ emitted by the local oscillator 112. The mixer 114 is a device or circuit that separates an incoming optical signal into its in-phase and quadrature components. The incoming optical signal $E_s(t)$ and light source signal $E_{LO}(t)$ of the local oscillator 112 can be expressed by the following equations:

$$E_s = \sqrt{P_s(t)} \exp[j\omega_s t + j\phi_s(t)] + n_{ASE}(t), \quad (1)$$

$$E_{LO} = \sqrt{P_{LS1}(t)} \exp[j\omega_{LS1} t + j\phi_{LS1}], \quad (2)$$

where $P_s$ and $P_{LS1}$ represent the power associated with the incoming optical signal $E_s(t)$ and the power associated with the light source signal $E_{LO}(t)$ emitted from the local oscillator 112, respectively, $n_{ASE}(t)$ represents the accumulated amplified spontaneous emission (ASE) noise, $\omega_s$ represents a frequency of the incoming signal, $\phi_s(t)$ represents noise including both data and phase noise of the transmitter laser used to transmit the incoming optical signal through the fiber optic link to the EPC system 100, $\omega_{LS1}$ represents the frequency of the light source signal emitted by the local oscillator 112, and $\phi_{LS1}$ represents the phase noise introduced by the light source of the local oscillator 112. The mixer 114 can perform a down conversion of the incoming optical signal $E_s(t)$ and can separate the incoming optical signal into in-phase and quadrature optical components. In-phase refers to a signal having a phase of zero (0) or pi ($\pi$) and quadrature refers to a signal having a phase of $\pi/2$ or $-\pi/2$.

The mixer 114 can generate two in-phase optical components, with one of the in-phase components having a phase of zero (0) and the other in-phase component having a phase of pi ($\pi$). The mixer 114 can generate two quadrature components, with one of the components having a phase of $\pi/2$ and the other quadrature component having a phase of $-\pi/2$. The in-phase components of the incoming optical signal $E_s(t)$ can be output by the mixer 114 to the optical-to-electrical converter 116, and the quadrature components can be output by the mixer 114 to the optical-to-electric converter 122.

The optical-to-electric converters 116 and 122 can be implemented as balanced detectors configured to convert the in-phase and quadrature optical components of the incoming optical signal $E_s(t)$ into in-phase electrical components and quadrature electrical components, respectively. The optical-to-electrical converter 116 can be implemented using photodetectors 118 and 120, and the optical-to-electric converter 122 can be implemented using photodetectors 124 and 126. The photodetector 118 can receive the in-phase optical component having a phase of zero and can convert the in-phase optical component to an in-phase electrical component with a phase of zero. The photodetector 120 can receive the in-phase optical component having a phase of $\pi$, and can convert the in-phase optical component into an in-phase electrical component with a phase of $\pi$. The photodetector 124 can receive the quadrature optical component having a phase of $\pi/2$, and can convert the quadrature optical component into a quadrature electrical component with a phase of $\pi/2$. The photodetector 126 can receive the quadrature optical component having a phase of $-\pi/2$, and can convert the quadrature optical component into a quadrature electrical component with a phase of $-\pi/2$.

The difference nodes 128 and 130 are devices or circuits that generate a signal representing a mathematical difference between two input signals. The difference node 128 can receive the in-phase electrical components from the converter 116 and can generate an in-phase electrical signal based on a difference between the in-phase electrical components having a phase of zero and $\pi$. This can result in a summation of the in-phase electrical components since the in-phase electrical component having a phase of $\pi$ is 180 degrees out of phase with the in-phase electrical component having a phase of zero. Likewise, the difference node 130 can generate a quadrature electrical signal based on a difference between the quadrature electrical components having a phase of $\pi/2$ and $-\pi/2$. This can result in a summation of the quadrature electrical components since the quadrature electrical component having a phase of $-\pi/2$ is 180 degrees out of phase with the quadrature electrical component having a phase of $\pi/2$.

For embodiments in which the coherent detector 114 is implemented using homodyne coherent detection, the frequency of the incoming optical signal $E_s(t)$ can be equal to the frequency of the light source signal $E_{LO}(t)$ emitted by the local oscillator 112 ($\omega_s=\omega_{LO}$) and the in-phase and quadrature photocurrents after balanced detection by the converters 116 and 122 can be expressed by the following equations:

$$i_I(t)=R\sqrt{P_s P_{LS1}}\cos(\phi_s-\phi_{LS1})+R\sqrt{P_{LS1}}Re\{n_{ASE}e^{-j\phi_{LS1}}\}+i_{sh1}, \quad (3)$$

$$i_Q(t)=\pm R\sqrt{P_s P_{LS1}}\sin(\phi_s-\phi_{LS1})+R\sqrt{P_{LS1}}Im\{n_{ASE}e^{j\phi_{LS1}+j\pi/2}\}+i_{sh2}, \quad (4)$$

where R is the photo-detector responsivity and $i_{sh}$ is the shot-noise, which refers to noise in a system from detectable random fluctuations of energy. In equation (4), the plus or minus sign of $i_Q(t)$ can be selected by setting the subtractor for the balanced detection of the quadrature components.

By grouping random variables, the following complex variable can be defined for the baseband RF signal, $$E_{RF}=I_{RF}\pm jQ_{RF}=C_1\sqrt{P_s(t)}\exp[\pm(j\phi_s(t)-j\phi_{LS1})]+n, \quad (5)$$

where $C_1$ is a constant, $\phi_{LS1}(t)$ is the laser phase noise of the local oscillator 112, and n is a complex number that includes any other source of noise. As expressed in Equation (5), the incoming optical signal $E_s$ is recovered with a power scaling factor and additional laser phase noise from the local oscillator 112.

The low pass filters 132 and 134 can receive the difference signals and can filter the difference signals to reduce or mitigate noise in the difference signals. The low pass filters 132 and 134 can have a cutoff frequency that is higher than the bandwidth of the in-phase and quadrature electrical signals.

The I/Q modulator 150 can include a light source 152, an electro-optic modulator, which can be implemented as a Mach-Zehnder modulator (MZM) 154, an electro-optic modulator, which can be implemented as a MZM 156, a phase shifter 158, optical coupler 160, and an optical amplifier 162. An optical-to-electrical converter refers to a device or circuit that converts an optical signal to an electrical signal. The local oscillator 152 can include a light source, such as a laser, and can emit a light source signal. The I/Q modulator 150 can receive the filtered in-phase and quadrature electric signals from the coherent detector 110, shift the phase of the in-phase and/or quadrature electrical signals to perform phase conjugation, convert the in-phase and quadrature electric signals into optical signals, upconvert the optical signals for transmission, and combine the optical signals to generate a phase conjugated outgoing optical signal for transmission through the optical fiber.

The MZMs 154 and 156 can use an electro-optic effect to convert the in-phase and quadrature electrical signals into optical signals using a Mach-Zedhner interferometer configuration. The MZMs 154 and 156 can receive the light source signal emitted from the local oscillator 152, which can be manipulated by the MZMs 154 and 156 using the in-phase and quadrature electric signals to generate an outgoing in-phase optical signal and an outgoing quadrature optical signal, respectively. For example, the in-phase and quadrature electrical signals can be used to control the MZMs 154 and 156, respectively, by changing a refractive index of one or more optical paths in the MZMs 154 and 156 through which the light source signal from the local oscillator 152 passes to change the delay associated with the one or more optical paths. For analog modulation, the MZMs 154 and 156 can be biased at null and can be fed with the real and imaginary components of $E_{RF}(t)$ (Eq. 5) (e.g., the in-phase and quadrature electrical signals).

The phase shifter 158 can receive the outgoing quadrature optical signal from the MZM 156 and can shift the phase of the outgoing quadrature optical signal by $\pi/2$ or $-\pi/2$. If a plus sign is selected in Equation (5), a phase shift of $\delta=-\pi/2$ is applied to the outgoing quadrature signal by the phase shifter 158, and if a minus sign is selected, a phase shift of $\delta=\pi/2$ is applied to the outgoing quadrature optical signal by the phase shifter 158.

The optical coupler 160 can combine the outgoing in-phase optical signal and the phase shifted outgoing quadrature optical signal to form a phase conjugated outgoing optical signal. The phase conjugated outgoing optical signal generated by the EPC system 100 before the signal is amplified can be expressed by the following equation:

$$E_{EPC}(t)=C_2[I_{RF}(t)-jQ_{RF}(t)]\exp[j\omega_{LS2}t+j\phi_{LS2}(t)], \quad (6)$$

where perfect linearity has been assumed and $\phi_{LS2}$ is the phase noise of a mid-span transmission laser, which can be used to transmit the outgoing optical signal over another span of the optical fiber link.

The amplifier 162 can amplify the outgoing optical signal for transmission over another section of the fiber optic link. Using Equation (5) and assuming the frequency of the light source signal emitted by the local oscillator 152 is equal to the frequency of the incoming optical signal ($\omega_{LS2}=\omega_s$) and setting the gain of the optical amplifier to $1/C_1C_2$, the outgoing phase conjugated optical signal output from EPC system 100 can be expressed by the following equation:

$$E_{EPC}(t)=\sqrt{P_s(t)}\exp[j\omega_s t-j\phi_s(t)+j\phi_{LS1}+j\phi_{LS2}]+n=E^*_s(t)\exp[j\phi_{noise}]+n, \quad (7)$$

The phase conjugated outgoing optical signal generated by the EPC system 100 can be an inverted version of the incoming optical signal, which compensates for impairments experienced by the incoming optical signal through the first section of the fiber link, and compensates for impairments the phase conjugated outgoing optical signal is expected to experience in the second section of the fiber link. When the modulator 150 is inverted, the laser noise contributions of local oscillator 112 and local oscillator 152 are cumulative. Therefore, in terms of total phase noise, the local oscillator 112 and local oscillator 152 can be implemented to be independent so that the random-walk character of the noise from the light sources of the local oscillators 112 and 152 are not doubled.

Figure 2:
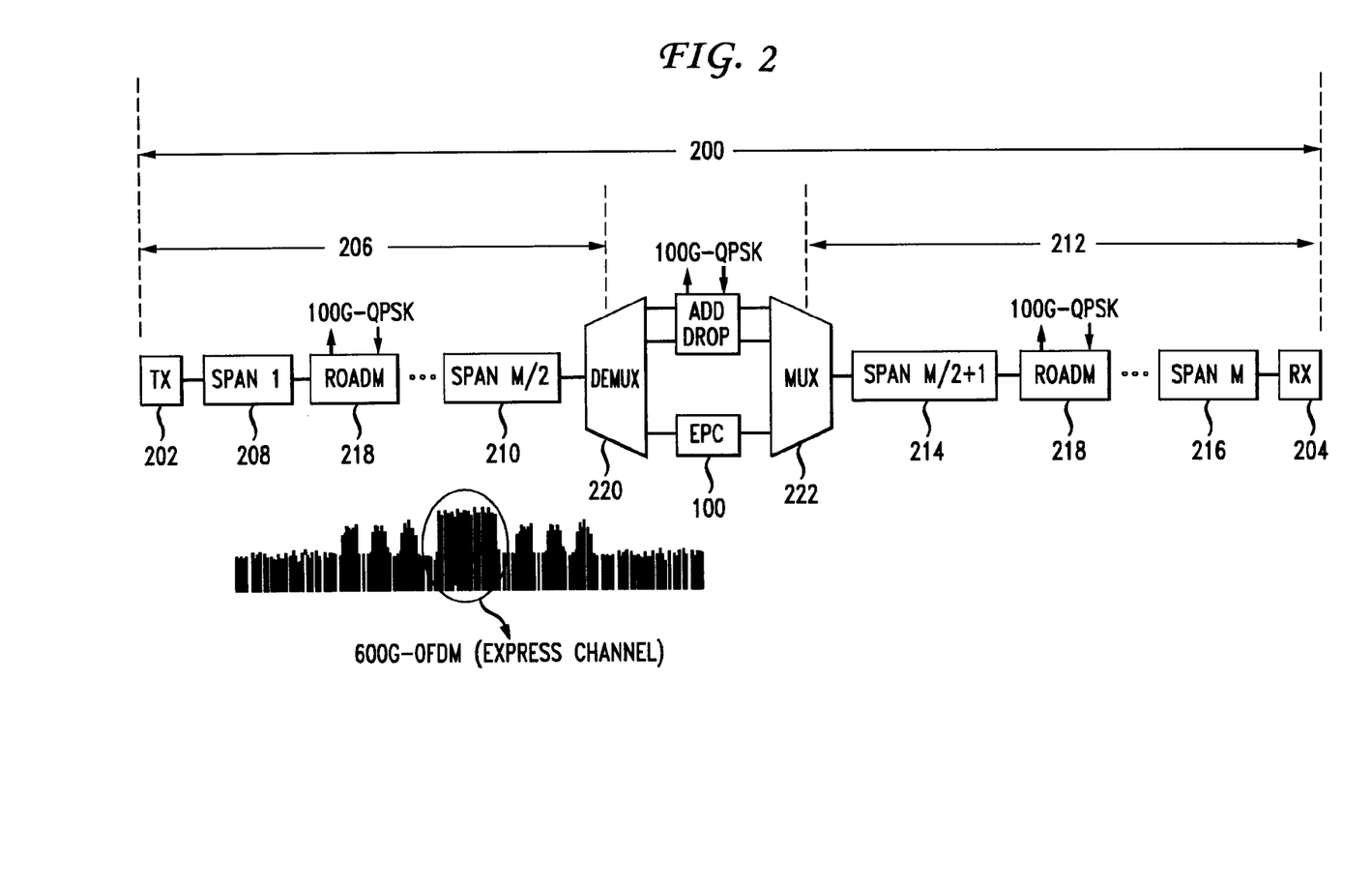
FIG. 2 is an exemplary fiber optic link in a communication system in which embodiments of the electronic phase conjugation system can be implemented.

FIG. 2 depicts an exemplary fiber optic link 200 in a communication system, in which an exemplary embodiment of the EPC system 100 can be implemented. The communication system is a system having one or more communicatively coupled devices used to transport information between end points. The optical fiber link is a communication link between a transmitter and a receiver, where the mode signal propagation is light through a fiber optic cable or fiber optic cable segments. The link 200 can be formed between a transmitter 202 and a receiver 204, and can be formed by a standard single mode fiber (SSMF) with amplifying elements 300 (FIG. 3), such as an Erbium-Doped Fiber Amplifier (EDFA), a distributed Raman amplifier, and the like. As one example, the total span of the link from the transmitter 202 to the receiver 204 can be 100 kilometers (km).

Figure 3:
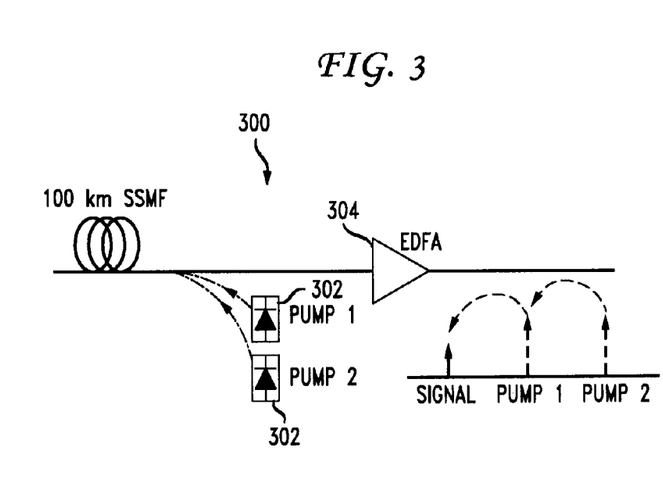
FIG. 3 is an exemplary span configuration for a fiber optic link that includes pump amplification to improve signal integrity of the link.

In the present example, the link 200 can have a dispersion parameter of D=16 ps/km/nm, a dispersion slope of $D_s$=0.08 ps/km/nm$^2$, a loss of 0.2 dB/km, and the nonlinear coefficient is $\gamma$=1.46 1/W/km. In the present example, a distributed Raman amplification can be used to provide power symmetry with respect to the location of the EPC system 100 in the link 200. One or more Raman amplification configurations single can be used, such as a single and/or cascaded Raman amplification. In the cascaded Raman amplification, an additional pump 302 is used to amplify pump 304, which ultimately amplifies the signal. The cascaded Raman configuration can improve power symmetry, which can be beneficial for impairment compensation. A Raman coefficient of Cr=0.41 l/W/km is assumed for the SSMF.

The link 200 can have a first section 206 formed between the transmitter 202 and a demultiplexer 220, and a second section 212 formed between a multiplexer 222 and the receiver 204. The first section can include a ROADM 218, which can divide the first section 206 into a first span 208 and a second span 210. The second section 212 can include a ROADM 218, which can divide the second section 212 into a third span 214 and a fourth span 216. The link 200 can support multi-rate optical channels, such as, a high-speed express channel (e.g., 64-QAM-OFDM, 600 Gb/s, 100 GBaud) and WDM neighboring channels (e.g., single carrier, QPSK 50 Gb/s, 25 GBaud). In the present example, spectral efficiency of the express channel can be 6 b/s/Hz with single polarization transmission. However, those skilled in the art will recognize that the EPC formulation can be extended to polarization-division multiplexing by using a polarization-diverse receiver in the EPC system 100.

In the present example, the 64 quadrature amplitude modulation (QAM)-OFDM express channel is transmitted by the transmitter 202 together with 6 neighboring QPSK channels. The channel spacing between the QPSK channels is 50 GHz, whereas the spacing between the express channel and the next QPSK channel is 100 GHz. After each sub-span, QPSK channels can be added or dropped by, for example, one of the ROADMs 218. The express channel is not dropped and EPC is performed at mid-link. The express channel can include 128 subcarriers modulated with a 64-QAM format.

The express channel can be demultiplexed into sub-bands using the demultiplexer 220, which can be implemented as a set of phase-locked local oscillators. One or more of the sub-bands can pass through one or more of the EPC systems 100. The EPC systems 100 can receive the incoming optical signals (e.g., the sub-bands) and can generate phase conjugated outgoing optical signals using electronic phase conjugation. The incoming optical signals can be converted to in-phase and quadrature electrical signals, which can be used by the EPC systems 100 to generate the phase conjugated outgoing optical signals. The phase conjugated outgoing optical signals can be combined using the multiplexer 222. The phase conjugation performed by the EPC systems 100 can lead to spectral inversion and, therefore, the phase conjugated outgoing optical signal can be wavelength-inverted.

Those skilled in the art will recognize that performing EPC in the middle of the link can give an optimal performance if the link has nearly perfect power and dispersion symmetry. However, those skilled in the art will recognize that the link may not have such perfect symmetry and that the optimal EPC location may not be located in the middle of the link. Moreover, the EPC system may be used to mitigate or compensate impairment from a portion of the spans. For example, if there are a total of 10 spans, the EPC system may be placed in a seventh span such that the impairments from spans 5, 6 and 7 are mitigated/compensated by spans 8, 9 and 10.

In some embodiments, embodiments of the EPC system can be implemented as an independent optical-electrical-optical (O-E-O) regenerator. In some embodiments, the EPC module can be implemented as one of the special operational modes in a full re-time, re-transmit, re-shape (3-R) regenerator. Such a dual-mode O-E-O regenerator (EPC mode and the normal 3R mode) can be useful in a fully dynamic optical network, where not only different wavelengths or channels may have different reach requirement, but the reach requirement for the same wavelengths or channels may also vary with time due to the nature of dynamic wavelength routing. In such a dynamic network this is due to the O-E-O regenerator being able to be switched to the EPC mode to save energy if the reach requirement can be achieved by the EPC system.

Exemplary embodiments disclosed herein have described using electronic phase conjugation for impairment compensation in fiber communication systems. Phase conjugation can be implemented in the electronic domain on a per channel basis using coherent detection together with inverted IQ modulation, and thus embodiments disclosed herein provide a compact and simple solution for the compensation of both fiber dispersion and intra-channel nonlinear effects in high bit-rate fiber transmission.

While exemplary embodiments have been described herein, it is expressly noted that the present invention is not limited to these embodiments, but rather the intention is that additions and modifications to what is expressly described herein are also included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. An electronic phase conjugation system associated with a communication system comprising:
a fiber optic link disposed between a transmitter and a receiver, the fiber optic link supporting multi-rate optical channels including a high-speed express channel;
an amplifying element coupled to the fiber optic link to improve power symmetry, the amplifying element compensating for impairment of an incoming high-order optical signal, the amplifying element supporting the multi-rate optical channels including the high-speed express channel;
an electronic phase conjugation element implemented non-symmetrically at the fiber optic link, the electronic phase conjugation element compensating for impairment of the incoming high-order optical signal due to the fiber optic link, the electronic phase conjugation element comprising:
a coherent detector responsive to the incoming high-order optical signal carrier as sub-bands from the fiber optic link, the coherent detector converting the incoming high-order optical signal to a final in-phase electrical signal and a final quadrature electrical signal the coherent detector comprising:
a first optical-to-electrical converter converting in-phase optical components to two in-phase electrical components;
a second optical-to-electrical converter converting quadrature optical components to two quadrature electrical components; and
a first difference node generating the final in-phase electrical signal in response to a difference between the two in-phase electrical components; and
a second difference node generating the final quadrature electrical signal in response to a difference between the two quadrature electrical components; and
an in-phase/quadrature modulator that generates a phase conjugated outgoing optical signal by modulating and shifting the phase of the final in-phase electrical signal and the final quadrature electrical signal to perform phase conjugation, the in-phase/quadrature modulator converting the final in-phase electrical signal and the final quadrature electrical signal into optical signals and combining the in-phase optical signal and the quadrature optical signal to generate the phase conjugated outgoing optical signal, thereby compensating for impairment of the incoming high-order optical signal and extending a system reach of the high-speed express channel.

2. The system of claim 1, wherein the coherent detector comprises a mixer separating the incoming optical signal into the in-phase optical components and the quadrature optical components.

3. The system of claim 2, wherein the mixer generates the in-phase optical components and the quadrature optical components, wherein a first in-phase optical component has a phase of zero, a second in-phase optical component has a phase of π, a first quadrature optical component has a phase of π/2, and a second quadrature optical component has a phase of −π/2.

4. The system of claim 1, wherein the in-phase/quadrature modulator comprises:
a first electro-optic modulator converting a light source signal into an outgoing in-phase optical signal in response to the in-phase electrical signal; and
a second electro-optic modulator converting the light source signal into the outgoing quadrature optical signal in response to the quadrature electrical signal.

5. The system of claim 4, wherein the in-phase/quadrature modulator comprises:
a phase shifter shifting a phase of the outgoing quadrature optical signal to form a phase shifted outgoing quadrature optical signal; and
an optical coupler combining the outgoing in-phase optical signal with the phase shifted outgoing quadrature optical signal to form the phase conjugated outgoing optical signal.

6. A communication system comprising:
a fiber optic link supporting multi-rate optical channels including a high-speed express channel, the fiber optic link compensating for impairment of an incoming high-order optical signal;
an electronic phase conjugation system disposed non-symmetrically between a first section of the fiber optic link and a second section of the fiber optic link, the electronic phase conjugation system receiving the incoming high-order optical signal carried in sub-bands from the first section of the fiber optic link, the incoming high-order optical signals being subject to distributed amplification to improve power symmetry and compensate for impairment of the incoming high-order optical signal;
a first optical-to-electrical converter converting in-phase optical components to in-phase electrical components;
a second optical-to-electrical converter converting quadrature optical components to quadrature electrical components;
a first difference node generating the in-phase electrical signal in response to a difference between the in-phase electrical components;
a second difference node generating the quadrature electrical signal in response to a difference between the quadrature electrical components, the electronic phase conjugation system generating a phase conjugated outgoing optical signal modulated by the in-phase electrical signal and quadrature electrical signal converted from the incoming optical signal, the phase conjugated outgoing optical signal compensating for impairment of the incoming high-order optical signal, supporting high spectral efficiency channels, and extending a system reach of the high-speed express channel.

7. The system of claim 6, wherein the electronic phase conjugation system comprises a coherent detector to convert the incoming high-order optical signal to the in-phase electrical signal and the quadrature electrical signal.

8. The system of claim 7, wherein the coherent detector comprises a mixer, the mixer performing a down conversion of the incoming high-order optical signal and separating the incoming high-order optical signal into two in-phase optical components and two in-phase quadrature components, the two in-phase optical components and two in-phase quadrature components being output by the mixer to two separate optical-to-electric converters, wherein a first one of the in-phase optical components has a phase of zero, a second one of the in-phase optical components has a phase of π, a first quadrature optical components has a phase of π/2, and a second one of the quadrature components has a phase of −π/2.

9. The system of claim 7, wherein the electronic phase conjugation system comprises an in-phase/quadrature modulator generating the phase conjugated outgoing optical signal.

10. The system of claim 9, wherein the in-phase/quadrature modulator comprises:
a local oscillator generating a light source signal;
a first electro-optic modulator converting the light source signal into an outgoing in-phase optical signal in response to the in-phase electrical signal; and
a second electro-optic modulator converting the light source signal into an outgoing quadrature optical signal in response the quadrature electrical signal.

11. The system of claim 10, wherein the in-phase/quadrature modulator comprises
a phase shifter shifting a phase of the outgoing quadrature optical signal to form a phase shifted outgoing quadrature optical signal; and
an optical coupler combining the outgoing in-phase optical signal with the phase shifted outgoing quadrature signal to form the phase conjugated outgoing optical signal.

12. A method for impairment compensation in a communication system comprising:
receiving an incoming high-order optical signal transmitted through a first section of an optical fiber link in a fiber communication system, the fiber communication system supporting multi-rate optical channels including a high speed express channel;
amplifying the incoming high-order optical signal in a portion of the optical fiber link to improve power symmetry and compensate for impairment of an incoming high-order optical signal;
converting in-phase optical components to two in-phase electrical components;
converting quadrature optical components to two quadrature electrical components;
generating a final in-phase electrical signal in response to a difference between the two in-phase electrical components;
generating a final quadrature electrical signal in response to a difference between the two quadrature electrical components; and
generating a phase conjugated outgoing optical signal modulated by the final in-phase electrical signal and final quadrature electrical signal converted from the incoming high-order optical signal, the phase conjugated outgoing optical signal compensating for impairment of the optical fiber link in the communication system at non-symmetric portions of the fiber optic link, thereby supporting the high-speed express channel, extending a system reach of a high spectral efficiency channel.

13. The method of claim 12, wherein converting the incoming high-order optical signal further comprises separating the incoming high-order optical signal into in-phase optical components and quadrature optical components, wherein a first in-phase optical component has a phase of zero, a second in-phase optical component has a phase of $\pi$, a first quadrature optical component has a phase of $\pi/2$, and a second quadrature optical component has a phase of $-\pi/2$.

14. The method of claim 12, wherein generating a phase conjugated outgoing optical signal comprises:
  generating the light source signal with a local oscillator;
  converting the light source signal into an outgoing in-phase optical signal in response to the in-phase electrical signal; and
  converting the light source signal into an outgoing quadrature optical signal in response the quadrature electrical signal.

15. The method of claim 14, wherein generating a phase conjugated outgoing optical signal comprises:
  shifting a phase of the outgoing quadrature optical signal to form a phase shifted outgoing quadrature optical signal; and
  combining the in-phase optical signal and the phase shifted outgoing quadrature optical signal to form the phase conjugated outgoing optical signal.

* * * * *